June 9, 1936.  J. KRONHEIM  2,043,586
MACHINE FOR MAKING STUFFING FOR FURNITURE
Filed July 28, 1933   5 Sheets-Sheet 1
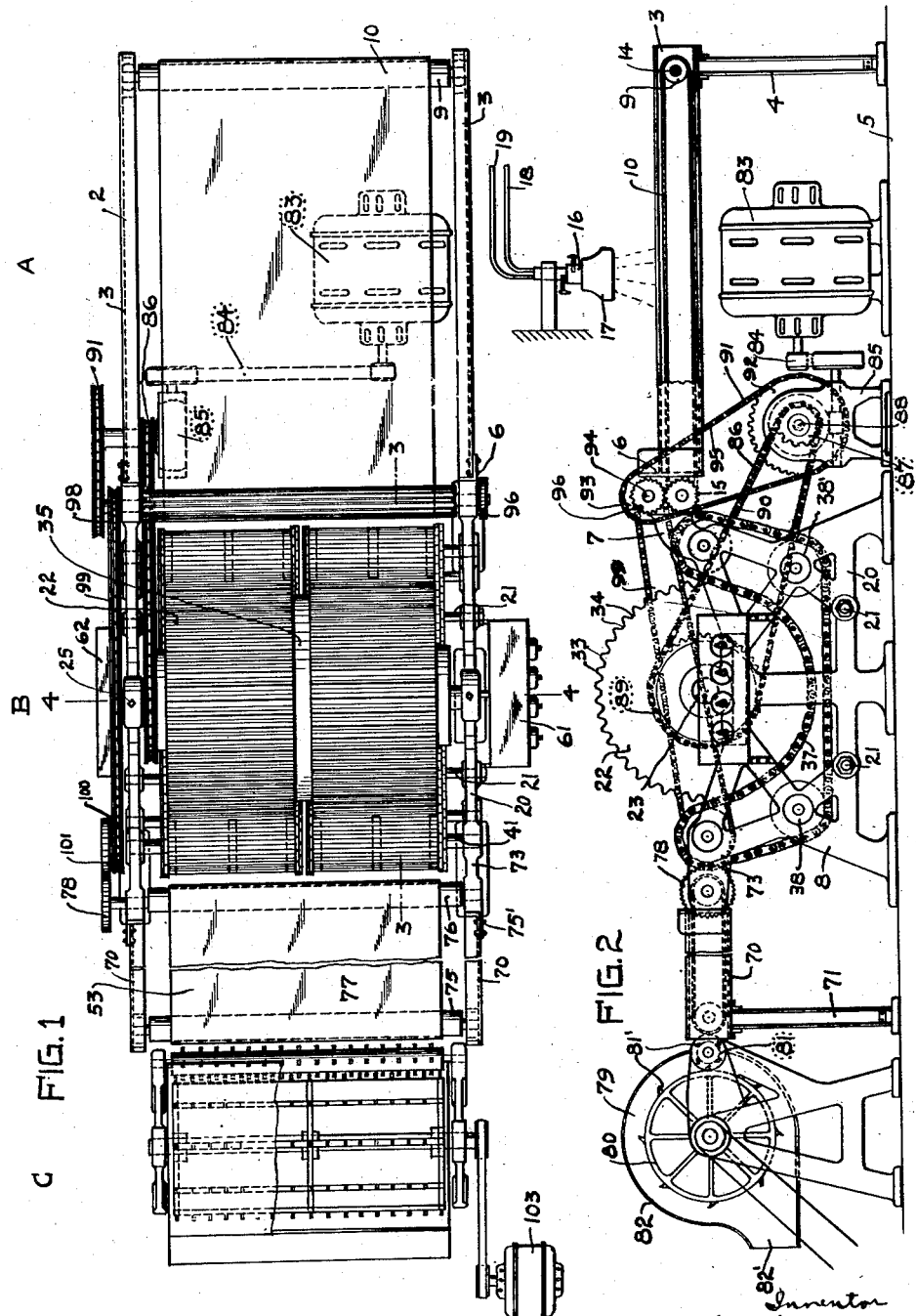
Inventor
Jacob Kronheim
By Fisher, Mosel & Moore
Attorney June 9, 1936.   J. KRONHEIM   2,043,586
MACHINE FOR MAKING STUFFING FOR FURNITURE
Filed July 28, 1933   5 Sheets-Sheet 2

Inventor
Jacob Kronheim
By Fisher, Moser + Moore
Attorney

June 9, 1936.  J. KRONHEIM  2,043,586
MACHINE FOR MAKING STUFFING FOR FURNITURE
Filed July 28, 1933  5 Sheets-Sheet 3
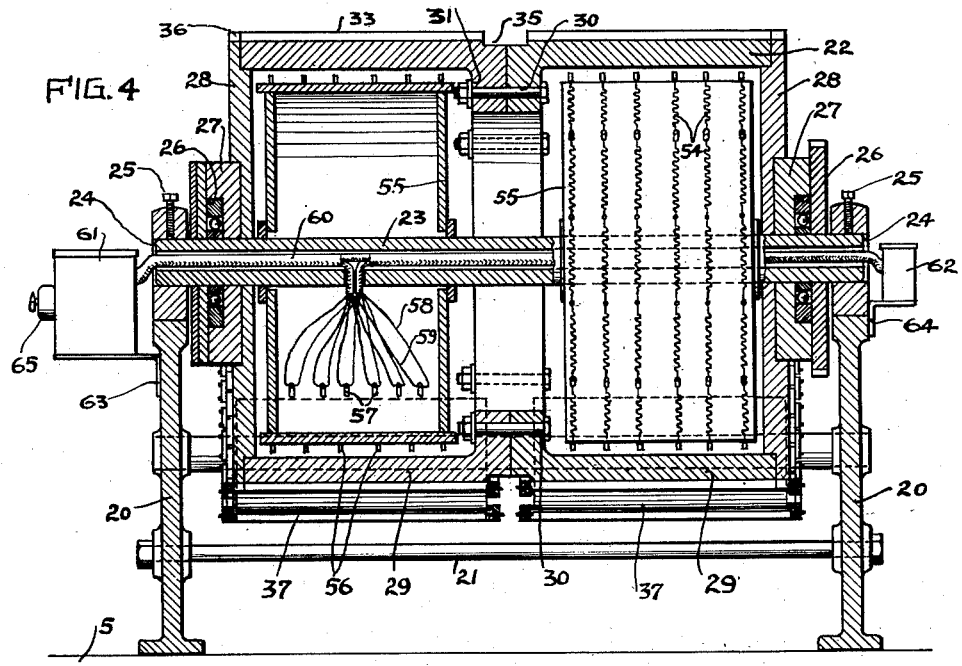

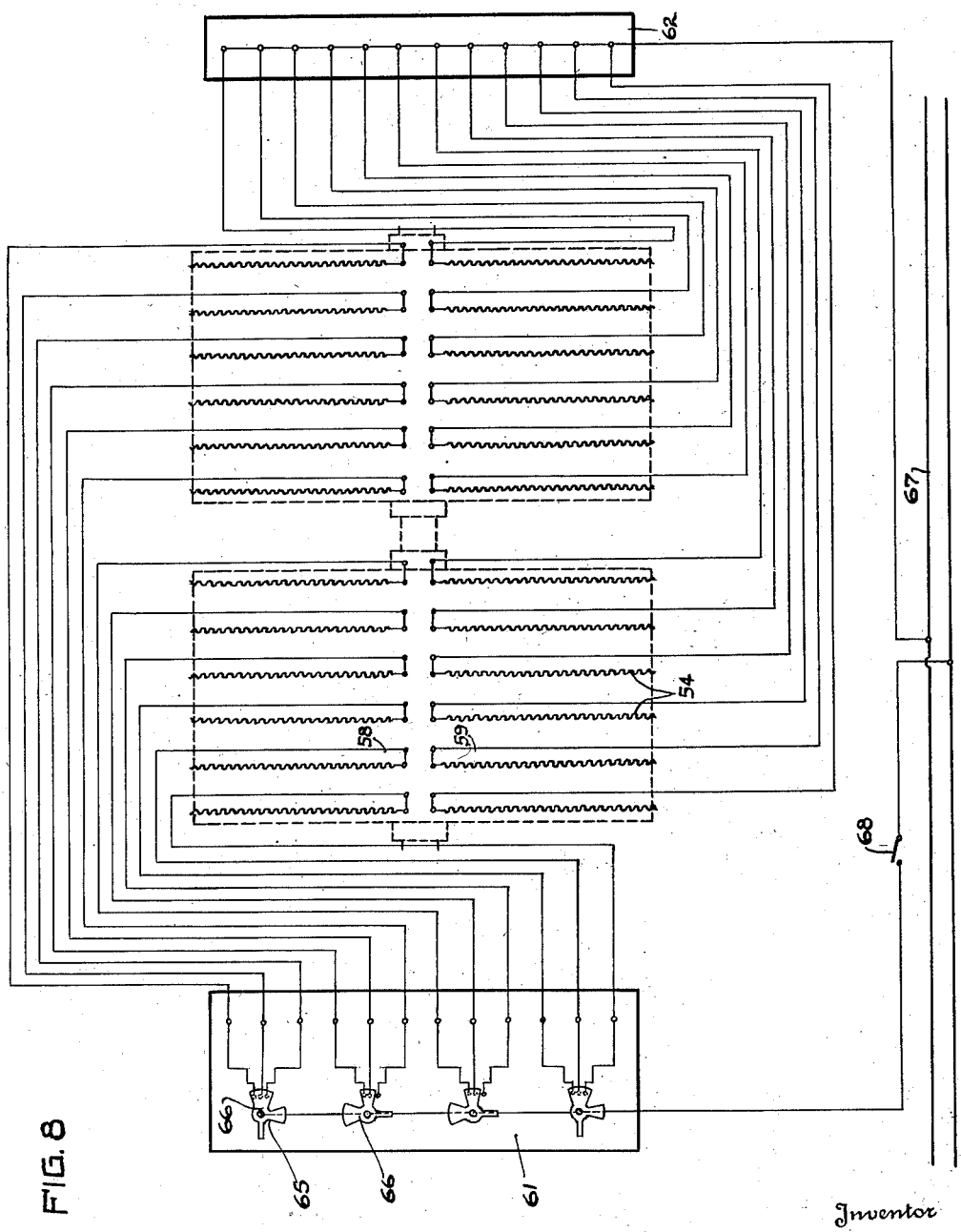

June 9, 1936. J. KRONHEIM 2,043,586
MACHINE FOR MAKING STUFFING FOR FURNITURE
Filed July 28, 1933 5 Sheets-Sheet 5
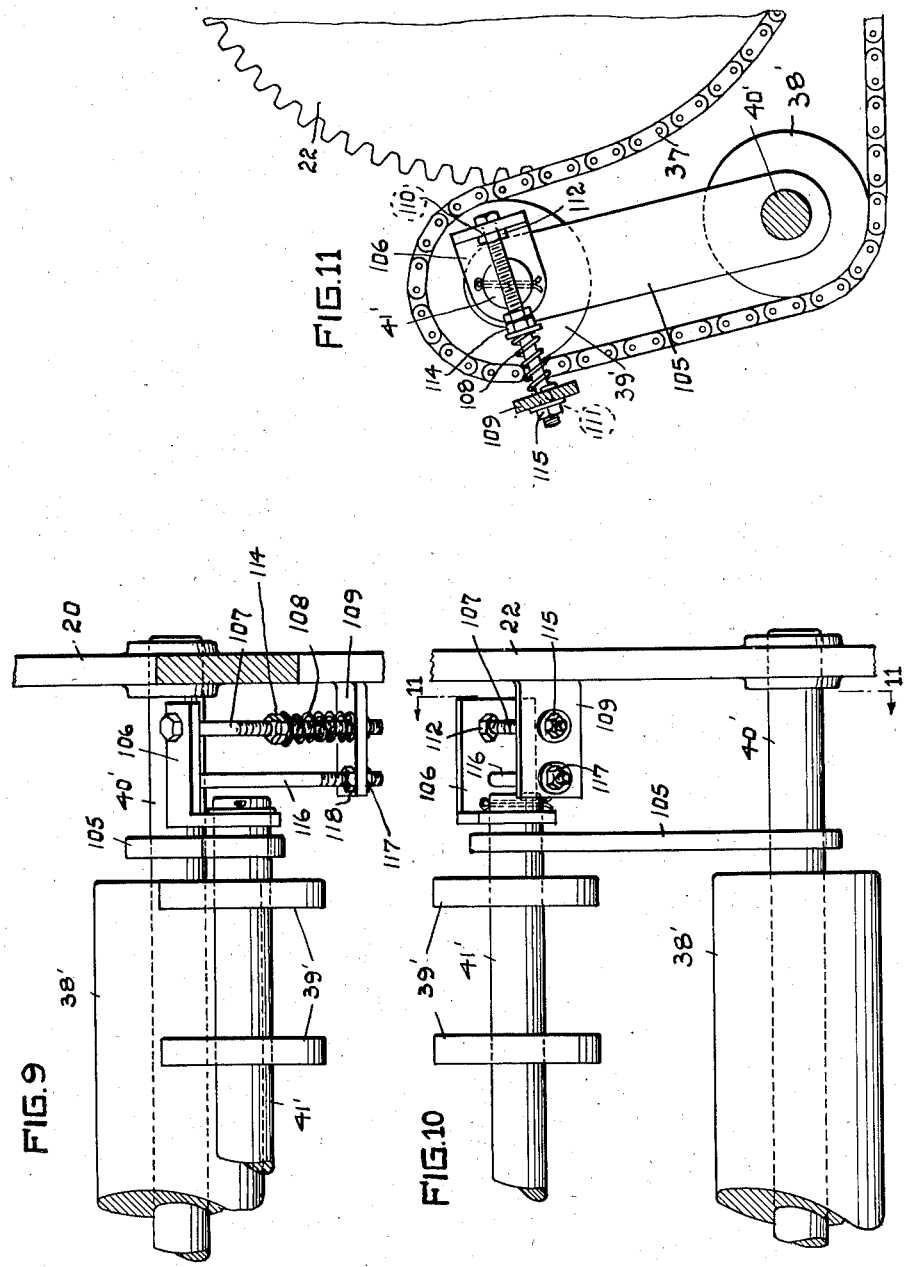

Patented June 9, 1936

2,043,586

UNITED STATES PATENT OFFICE 2,043,586

MACHINE FOR MAKING STUFFING FOR FURNITURE

Jacob Kronheim, Cleveland, Ohio

Application July 28, 1933, Serial No. 682,723

12 Claims. (Cl. 19—66)

My invention relates in general to stuffing for chairs, cushions, mattresses and the like and more particularly to sanitary, strong, durable, resilient, fibrous stuffing materials, which will not pack, gather and/or grind up in use, and which can readily be made from strips or strands of fibrous material, sprayed with water or other fluid, curled, dried and finally pulled or picked apart to impart the desired fluffiness to the material.

The general object of the present invention is to provide a machine for economically and continuously producing a stuffing of the kind referred to above which will be ready for immediate use as it leaves the machine.

Another object is to provide a machine for producing a stuffing of the kind referred to, including means for dampening the fibrous raw material, means for curling the material, means for drying the curled material and means for pulling and picking the curled and dried material.

Still another object is to provide a machine for treating fibrous material in which the curling and drying of the material is effected simultaneously during advancement of the material.

A further object is to provide a machine of the kind referred to which includes rotary curling and drying means, and permits curling and drying of the material for a substantial time interval while the material is continuously advancing.

With the above objects in view and in order that those skilled in this art may have a full and complete understanding of the structural and functional advantages of a machine embodying this invention and in order that the attainment of other desirable objects may be indicated, I have illustrated in the accompanying drawings a preferred embodiment of the invention, and throughout the various views of these drawings like reference characters refer to the same parts.

In the accompanying drawings:

Figure 1 is a plan view of a machine according to the invention which produces in a continuous manner the finished stuffing from fibrous raw material fed thereinto;

Figure 2 is a side view of Figure 1;

Figure 4 is an enlarged cross sectional view on line 4—4 of Figure 1;

Figure 5 is a fragmentary view of the chain conveyor used in curling the raw material;

Figures 6 and 7 are enlarged fragmentary top and side views of the chain conveyor and its link connection, the links being shown in section;

Figure 8 is a diagrammatic view of the electrical heating elements and their hook up for individual and joint operation of all elements.

Figure 3:
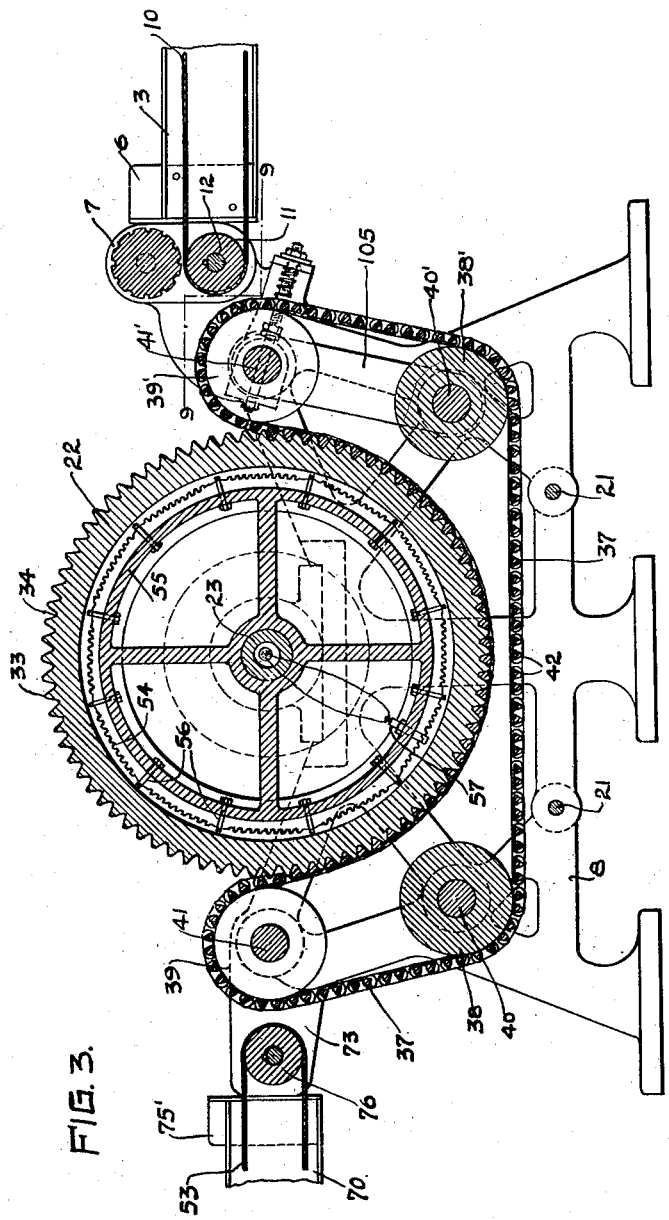
Figure 3 is an enlarged transverse view on line 3—3 of Figure 1.

Figures 9, 10 and 11 show the yielding mounting of the chain conveyor. Thus Figure 9 is a fragmentary sectional view on line 9—9 of Figure 3, Figure 10 is a front view of Figure 9 and Figure 11 a sectional view on line 11—11 of Figure 10.

The machine herein described, which is particularly designed to produce a resilient, fibrous stuffing material in a continuous manner, comprises three sections; the spraying section A for spraying the raw material with water or other fluid; the curling and drying section B and the picking and delivery section C. Of course all three sections of the machine cooperate continuously in producing the finished product, but it is thought that the operation of the machine will be best understood by describing each section.

Section A comprises a frame 2 of laterally spaced channel irons 3 having at their outer ends legs 4, which are preferably mounted in a foundation 5, extending lengthwise of the machine. The inner ends of channels 3 are connected to and supported by laterally extending arms 7 of the main frame 8 of the curling and drying section B, angle irons 6 being employed to connect the parts 3 and 7 together, as by riveting or the like. The outer ends of said channels 3 rotatably support an idler roller 9, and arms 7 of frame 8 rotatably support a driven roller 11 and mounted upon these rollers is an endless conveyor belt 10. The shaft 14 of idler roller 9 is stationary, whereas the shaft 12 of driven roller 11 is rotatably supported and carries at one end a driving gear 15. A spraying device 16 embodying a spraying nozzle 17, connected by means of supply lines 18 and 19 with a supply tank, not shown, is arranged above belt conveyor 10. Water, or where desirable, a chemical solution is sprayed upon the material while the latter is being conveyed toward the curling and drying section.

After the raw material has been sprayed with the desired amount of water or other fluid, this material is simultaneously curled and dried while advancing through the curling and drying section B. This section includes the main frame 8, previously referred to, which frame consists of two oppositely arranged frame members 20, mounted on the foundation 5 and rigidly secured together and properly spaced with respect to each other by tie rods 21. Frame members 20 support a hollow, cylindrical curling and drying drum 22 rotatably mounted on a hollow shaft 23, supported at its opposite ends in openings 24 of said frame members and rigidly held therein by means of set screws 25. Anti-friction roller bearings 26 mounted in perforated disks 27 in turn attached to the side walls 28 of drum 22 are employed to reduce friction between said shaft and drum. Preferably, as shown, the curling and drying drum embodies two drum sections 29 rigidly secured together at their flanged inner portions 31 by means of bolts 30. The periphery of the two part drum assembly 22 is longitudinally corrugated to provide elongated curling ribs and grooves 33 and 34 respectively. The inner ends of these ribs and grooves terminate in a circumferential channel 35, somewhat deeper than the grooves, and which extends about the middle periphery of the drum, for a purpose which will be described later. The peripheral edges 36 of the circular side walls 28 of drum 22, which are flush with the periphery of the drum 22, are corrugated in the same manner as the latter.

Corrugated drum 22 meshes with and drives two endless flexible curling and conveying members or chains 37, which interengage with the ribs 33 and grooves 34 of said drum, and are carried and guided by a series of idle rollers 38, 38' and 39, 39' rotatably supported on shafts 40, 40' and 41, 41', which shafts are mounted in frame members 20. As shown there are two curling chains one for each drum section 29, each of which chains embodies a series of approximately triangularly shaped rods 42, pivotally secured at opposite ends to the links of parallel side chains 44. These side chains 44 consist of supporting links 45 and connecting links 46, interconnected by the cylindrical end portions 47 of cross rods 42 and held against lateral movement by cotter pins 48. The oval shaped supporting links 45 include laterally offset shoulder portions or extensions 50, which co-operate with the flat bottom faces 51 of rods 42, to hold the rods in proper working position during curling operations, when the pointed top portions 52 thereof extend into the grooves 34 of drum 22. The outer side chains 44 engage with the side walls 28 and the inner side chains engage with the side walls of channel 35 in drum 22 and thus prevent lateral movement of the curling and conveying chains 37 on drum 22.

Each cross rod 42 of the curling and conveying chains 37 remains in mesh with drum 22 during more than one half a revolution of the latter, after being engaged by the advancing ribs 33. The material fed between said chains and the drum is thus subjected to curling pressure for a substantial time interval while passing the curling section. In order to attain this desideratum, and to effect proper feeding of the material from belt conveyor 10 into curling section B, the curling and conveying chains 37 are guided to travel in an approximately U-shaped or semi-circular course while in contact with the curling drum 22, and the longitudinal axis of the drum is of course symmetrically arranged with respect to said line of travel. This arrangement insures constant and intimate contact between the chains and drum throughout a greater portion of the drum area, and therefore also insures delivery of properly curled material to conveyor 53, which conveys the material to the picking and delivery section C, hereinafter described. Preferably belt conveyor 10 which feeds the sprayed or treated material into curling and drying section B is slightly elevated with respect to said section to facilitate feeding of raw material from the treating section into the curling section.

Idle rollers 39' are yieldingly supported to avoid undesirable stresses on chains 37, when heavy layers of material are fed between said chains and the drum 22. Thus the idle roller shaft 41' is mounted on brackets or link members 105, pivotally secured to idle roller shaft 40'. These brackets are yieldingly forced toward drum 22 by means of angular brackets 106, which are pivotally secured to opposite ends of shaft 41' and by means of bolts 107 and springs 108 cooperate with other brackets or angular extensions 109 on frame member 20 to yieldingly counteract stresses tending to swing brackets 105 away from drum 22. The bolts 107 which extend through openings 110 in brackets 106 and openings 111 in extensions 109 are rigidly secured to bracket 106 by means of a nut member 112 and are slidably extended through extensions 109. Springs 108 sleeved upon said bolts seat against brackets 109 and spring tension adjusting nuts 114 and force angular brackets 106 toward drum 22. Nut members 115 at the ends of bolts 107 limit the movement of bracket 106 toward drum 22, and bolts 116 secured to extensions 109 by means of nut members 117 and 118 cooperate with brackets 106 in limiting movement of bracket or links 105 in an opposite direction.

It is essential that the raw material be subjected to both heat and pressure in order to produce the desired curling effect, thus the pressure is exerted by curling chains 37, and the heat is supplied by curling drum 22. Enclosed within the latter are a pair of cylinders 55, one for each drum section 29, rigidly supported upon stationary hollow shaft 23, and connected to the periphery of these cylinders by means of spaced insulating posts 56, are a plurality of electrical heating elements 54. Each cylinder carries six electrical heating elements or coils 54, each of which encircles its respective cylinder 55. The free ends of these heating coils extend inwardly through openings in the cylinders and are connected to connecting posts 57, from which lead wires 58, 59 and a cable 60 extend to and through hollow shaft 23 to a switch box 61 and a connecting box 62, attached to main frame 8 opposite the ends of hollow shaft 23 by means of brackets 63 and 64 respectively. Switch box 61 contains four switches 65, each of which is electrically connected with three heating coils, and by means of a three arm bridge 66 permits connection of one, two or three coils 54 with the line 67, and safety switch 68 is employed to prevent overheating of the coils.

After the material has been curled and dried in the continuous manner previously described, said material is conveyed to the picking and delivery section C, by means of endless belt 77 of conveyor 53, which operates over an idler roller 75 and a driven roller 76. Roller 75 is mounted in the outer ends of a pair of channel irons 70 secured at their inner ends to arms 73, on frame 8 by means of brackets 75', and supported at their outer ends by legs 71. Conveyor 53 delivers the curled and dried material to the pulling and picking device C, arranged in alignment with and adjoining the discharge end of said conveyor. This device, which is of common design, embodies two oppositely rotating picking rolls 80 and 81, arranged in a housing 82, having at one side thereof an elongated discharge opening 82' through which the finished product is discharged. The rotating picking rolls 80 and 81 carry a plurality of picking teeth 81' adapted to separate or split the material longitudinally into a multiplicity of fine fibers or threads and to change the previously curled, dried and hardened material into a curly, fluffy product of inherent resiliency. According to common practice in picking devices of the kind shown, rolls 80 and 81 rotate with different speed and are of different size to more readily accomplish the desired results.

The machine thus described is driven by an electric motor 83. This motor 83 is coupled by means of a pulley drive 84 with a reduction unit 85, which in turn is coupled with the rotatable curling and drying drum 22 by means of a chain drive 86. This chain drive embodies a small gear 87, rigidly connected to shaft 88 of reduction unit 85, a large gear 89, rigidly connected to drum 22 and a chain 90. The pulley drive 84, the reduction unit 85 and the chain drive 86 reduces the speed of drum 22 relative to that of motor 83 to a ratio of 1 to 10 revolutions per minute. These relative speeds are essential so that drum 22 will have contact with the material sufficiently long to insure satisfactory curling and drying. It is also essential that the speed of travel of conveyor belts 10 and 77 be timed relatively to that of drum 22, in order to insure the feeding of proper amounts of treated material to curling and drying section B. Conveyor belt 10 must travel much faster than the relative travel of drum 22, because of the curling of the material in section B, where the material is subjected to a corrugating, curling action and therefore is greatly decreased in length in comparison to that of the material before being corrugated. Of course the extent of the corrugating surface of the drum must be taken into consideration when determining the necessary relative speeds of conveyor belt 10 and drum 22. Unless the relative speeds of travel are properly gauged the material will either buckle or the continuity of the stream of material being fed to the drum will be broken. On the other hand the speed of travel of conveyor belt 77 must be approximately equal to that of the travel of the curling and drying surface of drum 22, to prevent stretching of the curled material or accumulation of curled and dried material in front of the pulling and picking device 79. To that effect there is provided a chain drive 91 between reduction unit 85 and conveyor 10, which chain drive includes a large gear 92, rigidly mounted on shaft 88 of reduction unit 85, a smaller idler gear 93 mounted on idler shaft 94 and a chain 95. Idler shaft 94 carries at its opposite end a gear 96 in mesh with gear 15 on driven roller 11 which drives conveyor belt 10. Belt 77 is driven from idler shaft 94 by means of a chain drive 99. Thus idler shaft 94 carries a small gear 98 coupled by means of the chain 99 with a larger idler gear 100, rigidly connected with the rotatably supported shaft 41 of roller 39, which shaft in turn carries at its opposite end a gear 101 meshing with gear 78 on driven roller 76 which drives belt 77. The pulling and picking device 79 is driven by a separate motor 103, so that the speed of picking rolls 80 and 81, can be conveniently adjusted.

The operation of the machine is as follows: When heating elements 54 have sufficiently heated drum 22, the raw material is manually or automatically fed to conveyor 10, and during its travel on said conveyor the material is dampened by spraying device 16. The moist material is then fed uninterruptedly to the curling and drying section where it is pressed between the heating, curling and drying drum 22 and curling chain 37 while being continuously advanced, and after leaving said section dried and curled is conveyed to the pulling and picking device 79, where said material is pulled and picked apart and finally discharged through discharge opening 82'.

It is believed that the foregoing conveys a clear understanding of my improvements and the objects prefaced above, and it should be understood that while I have illustrated only one working embodiment of my invention various changes and modifications might be made without departing from the spirit and scope of the invention as expressed in the appended claims.

Having thus described my invention, what I claim is:

1. In a machine for making stuffing for chairs, couches etc. from fibrous material having a curling section, a stationary hollow shaft, a hollow curling drum rotatably mounted on said shaft, a plurality of heating means within said curling drum rigidly mounted on said shaft, means for individual and combined operation of said heating means, means extending through said hollow shaft to said heating means for interconnecting said operating means with said heating means, and an endless curling chain opposite said curling drum for cooperation therewith during curling operations.

2. In a machine for making stuffing for chairs, couches, etc. from fibrous material having a curling section, a frame, a hollow shaft rigidly secured to said frame, a hollow curling drum rotatably mounted within said frame upon said hollow shaft, a plurality of electrical heating coils within said curling drum rigidly mounted on said shaft, switch means for individual and combined operation of said heating coils, wire connections between said coils and said switching means extending through said hollow shaft and an endless curling chain opposite said curling drum for cooperation therewith during curling operations.

3. In a machine for making stuffing for chairs, couches etc. from fibrous material having a curling section as described in claim 1, an endless curling chain embodying oppositely arranged chains and approximately triangularly shaped connecting rods supported by said chains, said chains including supporting links having means cooperating with said connecting rods in holding same in proper working position.

4. A machine for continuously making stuffing for chairs, couches etc. from fibrous material, comprising driven rotatable curling means, heating means for said curling means, a conveyor for feeding material into said rotatable curling means, a conveyor for conveying curled material from said curling means and driving means for said curling means and said conveyors, said feed conveyor being driven at greater speed than said curling means and said other conveyor.

5. In a machine for continuously making stuffing for chairs, couches etc. from fibrous material, means for treating the material with a fluid, rotatable means for curling and drying the material, conveying means for feeding material to said rotatable curling and drying means, driving means for said conveying means and said rotatable curling means adapted to drive said conveying means and curling means at different speeds, individually driven picking and pulling means, and conveying means driven by said driving means at the speed of said curling means to feed the curled and dried material in a continuous uninterrupted flow to said picking and pulling means.

6. A machine for making stuffing for chairs, couches etc. from fibrous material, comprising a frame, a hollow drum mounted on said frame having a corrugated surface, an endless belt-like curling means contacting with and driven by said drum adapted to advance and curl material by contacting same with the drum, guide rollers movable on said frame for guiding said curling means, a sub-frame structure hingedly connected to said frame, one of said guide rollers being mounted on said sub-frame and means on said frame yieldingly shifting said sub-frame to effect tensioning of said endless curling means, curling of material at a yielding predetermined pressure.

7. A machine for making stuffing for chairs, couches etc. from fibrous material including a heated curling section, conveying means for advancing material to said curling section, a picking section, and conveying means for feeding curled material from said curling section to said picking section, said curling section including a curling drum and an endless belt-like curling means cooperating with said drum in curling and advancing said material under predetermined yielding pressure through said curling section and said belt like curling means and the conveyor means between said curling section and said picking section advancing with equal speed.

8. In a machine for continuously making stuffing for chairs, couches etc. from moistened fibrous material, rotatable means for curling and drying the previously moistened material, conveying means for feeding material to said rotatable curling and drying means, driving means for said conveying means and said rotatable curling means adapted to drive said conveying means and curling means at different speeds, driven picking and pulling means, and conveying means driven by said driving means at the speed of said curling means for feeding the curled and dried material in a continuous uninterrupted flow to said picking and pulling means.

9. In a machine for making stuffing for upholstery from fibrous material comprising a curling section, a stationary hollow shaft, a hollow curling drum rotatably mounted on said shaft, a plurality of heating means within said curling drum, means for individual and combined operation of said heating means, means extending through said hollow shaft to said heating means for interconnecting said operating means with said heating means, and an endless curling chain opposite said curling drum for co-operation therewith during the curling operation.

10. In a machine for making stuffing for upholstery from fibrous material, comprising a curling section a stationary hollow shaft, a hollow curling drum rotatably mounted on said shaft, a plurality of heating means within said curling drum and rigidly carried by said shaft, means for the individual and combined operation of said heating means, and an endless curling chain opposite said curling drum for co-operation therewith during the curling operation.

11. In a machine for making stuffing for chairs, couches, etc., from fibrous material having a curling section, a frame, a hollow shaft rigidly secured to said frame, a hollow curling drum rotatably mounted within said frame upon said hollow shaft, a plurality of electrical heating coils within said curling drum, switch means for individual and combined operation of said heating coils, wire connections between said coils and said switching means extending through said hollow shaft, and an endless curling chain opposite said curling drum for co-operation therewith during curling operations.

12. A machine for continuously making stuffing for upholstery from fibrous material, comprising a moving curling means, heating means for said curling means, a conveyor for feeding material into said curling means, a conveyor for conveying curled material from said curling means, and driving means for the curling means and conveyors, and said feed conveyor being driven at a greater speed than the curling means and the other conveyor.

JACOB KRONHEIM.